US012683538B2

(12) United States Patent
Myers

(10) Patent No.: US 12,683,538 B2
(45) Date of Patent: Jul. 14, 2026

(54) PANEL CLAMP ASSEMBLY

(71) Applicant: Todd Allen Myers, Grand Rapids, MI (US)

(72) Inventor: Todd Allen Myers, Grand Rapids, MI (US)

( * ) Notice: Subject to any disclaimer, the term of this patent is extended or adjusted under 35 U.S.C. 154(b) by 252 days.

(21) Appl. No.: 18/143,504

(22) Filed: May 4, 2023

(65) Prior Publication Data

US 2024/0146233 A1 May 2, 2024

Related U.S. Application Data

(60) Provisional application No. 63/421,429, filed on Nov. 1, 2022.

(51) Int. Cl.
*H02S 20/20* (2014.01)
*F16B 2/06* (2006.01)

(52) U.S. Cl.
CPC .............. *H02S 20/20* (2014.12); *F16B 2/065* (2013.01)

(58) Field of Classification Search
CPC ................................ H02S 20/20; F16B 2/065
See application file for complete search history.

(56) References Cited

U.S. PATENT DOCUMENTS 10,801,755 B1    10/2020 Nemat et al.
2015/0092383 A1*   4/2015 Corio ...................... H02S 20/30
248/214

2015/0200621 A1*   7/2015 Reed ...................... F24S 25/636
29/525.01
2016/0190976 A1*   6/2016 Corio .................... F24S 25/634
248/214
2021/0396255 A1    12/2021 Watson et al.

OTHER PUBLICATIONS

PCT Application Serial No. PCT/US2023/078343, International Search Report and Written Opinion dated Mar. 22, 2024.

* cited by examiner

*Primary Examiner* — Tae-Sik Kang
(74) *Attorney, Agent, or Firm* — Larry E. Henneman, Jr.; Henneman & Associates, PLC

(57) ABSTRACT

An example clamp assembly for a solar panel includes a clamp frame, a first clip, a second clip, and a fastener. The inner surface of the clamp frame has a polygonal contour. The clamp frame defines a first aperture, a first contact pad, a second aperture, and a second contact pad. The first clip defines a fastener passage, and the second clip includes a fastener engaging portion. Both clips are T-shaped and include panel engaging portions, which include contact surfaces formed on the undersides of a cross portion of the T-shapes. The fastener includes a complementary engaging portion configured to engage the fastener engaging portion of the second clip. The fastener passes through the first aperture, the second aperture, and the third aperture, and engages the complementary engaging portion with the fastener engaging portion of the second clip.

16 Claims, 12 Drawing Sheets

800

900

1000

1100

1200

1

PANEL CLAMP ASSEMBLY

RELATED APPLICATIONS

This application claims the benefit of U.S. Provisional Patent Application No. 63/421,429, filed on Nov. 1, 2022 by the same inventor, which is incorporated herein by reference in its entirety.

BACKGROUND OF THE INVENTION

Field of the Invention

This invention relates generally to solar panels, and more particularly solar panel mounting hardware.

Description of the Background Art

Solar panels are becoming an increasingly more popular means to collect energy. In large solar energy collection facilities, solar panels are often clamped to rails that rotate slowly throughout the day so that the panels track the position of the sun. Ideally, the planar surface of a solar panel should be perpendicular to the direction of the incident light rays, so it is important that the clamps maintain a fixed position of the panel with respect to the hosting rail.

Unfortunately, many of the clamps currently on the market are susceptible to working loose over time. There are a variety of reasons for this such as, for example, exposing the solar panels to windy conditions, dramatic temper changes, and so on. Another drawback to such clamps is that they include a relatively high number of subcomponents, which increases the labor to install the clamps as well as the overall cost.

SUMMARY

What is needed is a clamp assembly that remains in a fixed position in harsh conditions, is made up of fewer parts, and requires less labor to install.

The present invention overcomes the problems associated with the prior art by providing a solar panel clamp that secures panels to rails without loosening over time, requires less components to function, and cost less to manufacture and install. A particular example clamp assembly includes a standard bolt disposed through an extruded aluminum frame and two extruded T-clips. The T-clips are extruded from two separate dies that have different profiles. The one of the clips that serves as a locking nut has flat sides, to facilitate engagement by an open-ended wrench, and has a bore that is threaded to engage the threads of the bolt. The other T-clip defines a smooth bore and a rounded outer profile that have the same dimensions as the inner diameter and outer diameter of a standard ⅜" washer, respectively. In an alternate embodiment, both of the T-clips can be extruded from the same die, but only one of the clips needs to be subjected to a post-extrusion threading process. The frame is formed from conductive metal and also functions as a conductive pathway between the solar panels and the hosting rail.

An example solar panel assembly includes a rail, a clamp frame, a first solar panel, a second solar panel, a first clip, a second clip, and a fastener. The rail includes an outer surface, which has a particular contour. In a particular example, the particular contour of the outer surface of the rail can be polygonal. The clamp frame includes an inner surface. The inner surface can have a contour complementary to the contour of the outer surface of the rail. The clamp frame can define a first aperture, a first contact pad, a second aperture, and a second contact pad. The first solar panel has a rear surface abutting a first side of the first contact pad and a first side of the second contact pad. The second solar panel also has a rear surface abutting a second side of the first contact pad and a second side of the second contact pad.

The first clip can include a fastener receiving portion, a panel engaging portion, and an intermediate portion extending between the fastener receiving portion and the panel engaging portion, and the fastener receiving portion can define a third aperture. The first clip can be disposed adjacent the frame with the third aperture being aligned with the first aperture. The intermediate portion can extend between the first solar panel and the second solar panel. The panel engaging portion includes a first contact surface and a second contact surface. The first contact surface can abut a front surface of the first solar panel, and the second contact surface can abut a front surface of the second solar panel.

The second clip can include a fastener engaging portion, a panel engaging portion, and an intermediate portion extending between the fastener engaging portion and the panel engaging portion. The second clip can be disposed adjacent the frame with the fourth aperture aligned with the second aperture. The intermediate portion of the second clip can extend between the first solar panel and the second solar panel. The panel engaging portion of the second clip can include a first contact surface and a second contact surface. The first contact surface can abut a front surface of the first solar panel, and the second contact surface can abut a front surface of the second solar panel. A fastener can passing through the first aperture, the second aperture, and the third aperture, and can engage the fastener engaging portion of the second clip.

In an example solar panel assembly, the fastener can include a thread set, and the fastener engaging portion can include a complementary thread set. The fastener can include a head opposite the thread set, and the head can directly abut a first side of the first clip. A second side of the first clip can directly abut a first side of the clamp frame. A second side of the clamp frame can directly abut a first side of the second clip. The first side of the clamp frame can be substantially parallel to the second side of the clamp frame, and the first side of the clamp frame can be substantially perpendicular to an axis passing through the first aperture and the second aperture.

In an example solar panel assembly, the first clip can be a unitary structure. The second clip can also be a unitary structure. The clamp frame can also be a unitary structure.

In a particular example solar panel assembly, at least one of the first contact pad and the first contact surface of the first panel engaging surface of the first clip can define a set of serrations. The first contact pad can define a set of serrations oriented along a first direction, and the first contact surface of the first panel engaging surface of the first clip can define a set of serrations oriented along a second direction. The first direction can be oriented at a non-zero angle with respect to the second direction. In a more particular example, the first direction can be substantially perpendicular to the second direction.

In an example solar panel assembly the first contact pad can define and/or lie in a first plane. The second contact pad can also define and/or lie a second plane. The first plane and the second plane can form an angle that is greater than 180 degrees when the clamp frame is in a relaxed state, and the first plane and the second plane can form an angle that is less than or equal to 180 degrees when the clamp frame is flexed responsive to force exerted by the fastener.

In an example solar panel assembly, the first aperture can define a first central axis, and the second aperture can define a second central axis. A relative orientation between the first central axis and the second central axis can change when the clamp frame is flexed responsive to force exerted by the fastener. The change in the relative orientation of the first central axis and the second central axis can increase a frictional force between a shaft of the fastener and a wall of the clamp frame defining the first aperture. In a particular example solar panel assembly, the first aperture can be a substantially circular bore, and the second aperture can be a substantially circular bore. The third aperture can also be a substantially circular bore.

In an example solar panel assembly, the fastener engaging portion of the second clip can have an outer contour configured to engage an open end wrench. For example, the outer contour of the fastener engaging portion can include a first flat side and a second flat side opposite the first flat side. The first flat side can be substantially parallel to the second flat side.

In an example solar panel assembly, the clamp frame is electrically conductive. The first clip can also be electrically conductive. The first clip and the clamp frame can form a first portion of an electrical path from the first solar panel to ground. The second clip can also be electrically conductive, and the second clip can form a second portion of the electrical path to ground in parallel with the first clip.

An example clamp assembly for a solar panel is also disclosed. The example clamp assembly can include a clamp frame, a first clip, a second clip, and a fastener. The clamp frame can include an inner surface. The inner surface can have a polygonal contour, including a plurality of solid sides and defining an opening on at least one side. The clamp frame can define a first aperture, a first contact pad, a second aperture, and a second contact pad.

The first clip can define a fastener passage and can include a panel engaging portion and an intermediate portion extending between the fastener passage and the panel engaging portion. The fastener passage can define a third aperture. The first clip can be substantially T-shaped, with the fastener receiving portion being disposed at a bottom of the T-shape, and the panel engaging portion forming a cross of the T-shape. The panel engaging portion can include a first contact surface formed on an underside of one side of the cross and a second contact surface formed on an underside of an opposite side of the cross.

The second clip can include a fastener engaging portion, a panel engaging portion, and an intermediate portion extending between the fastener engaging portion and the panel engaging portion. The second clip can be substantially T-shaped, with the fastener engaging portion being disposed at a bottom of the T-shape of the second clip, and the panel engaging portion forming a cross of the T-shape of the second clip. The panel engaging portion of the second clip can include a first contact surface, formed on an underside of a first side of the cross of the T-shape of the second clip, and a second contact surface, formed on an underside of an opposite side of the cross of the T-shape of the second clip.

The fastener can include a complementary engaging portion configured to engage the fastener engaging portion of the second clip. The fastener can have a sufficient length to pass through the first aperture, the second aperture, and the third aperture, and engage the complementary engaging portion with the fastener engaging portion of the second clip.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a solar panel clamp assembly having integral fastening features. In the following description, numerous specific details are set forth (e.g., fastener specifications, hardware material types, etc.) in order to provide a thorough understanding of the invention. Those skilled in the art will recognize, however, that the invention may be practiced apart from these specific details. In other instances, details of well-known manufacturing practices (e.g., extrusion, electrical connection, routine optimization, etc.) and components have been omitted, so as not to unnecessarily obscure the present invention.

Figure 1:
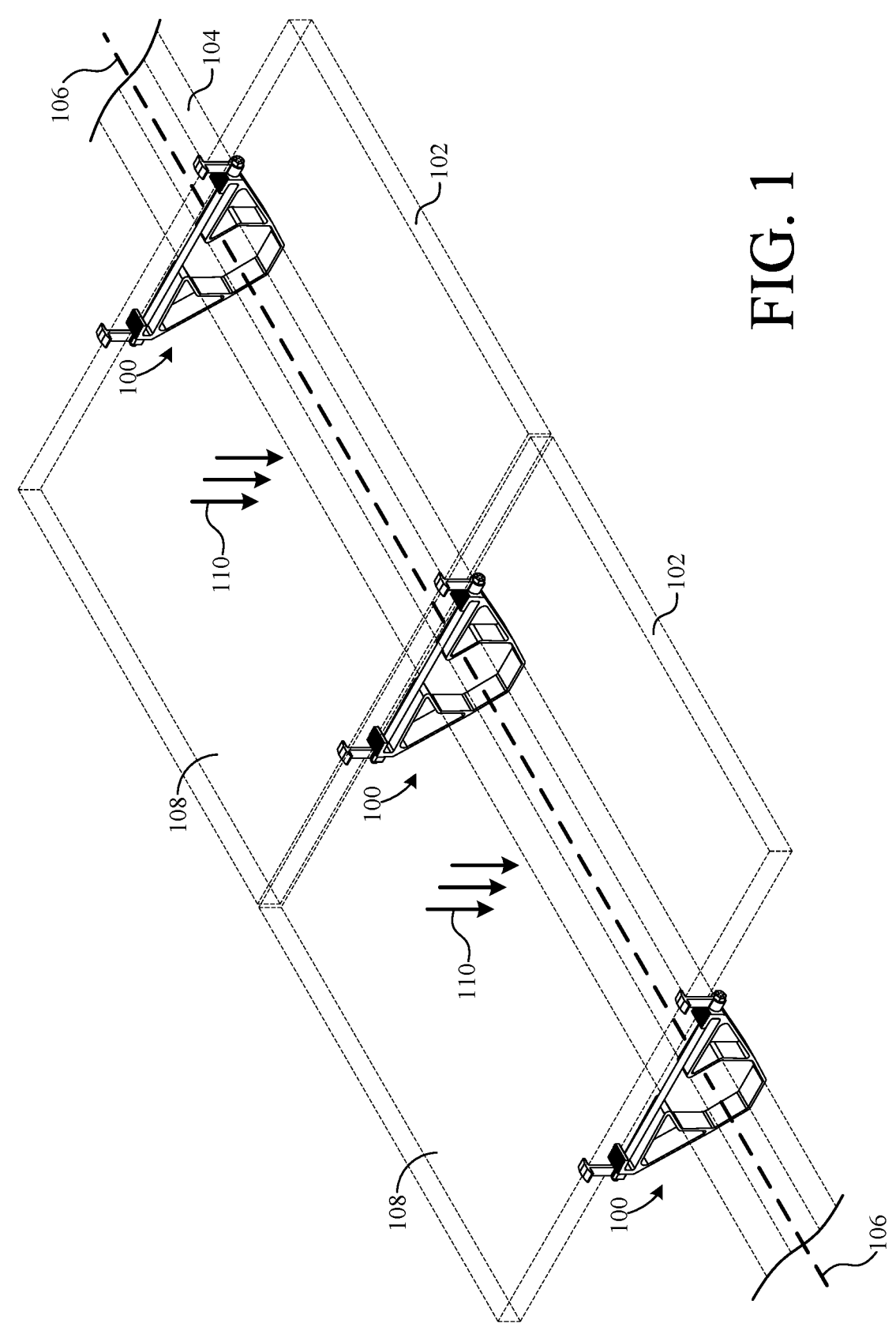
FIG. 1 is a perspective view of a plurality clamp assemblies mounting a plurality of solar panels to a rotating rail.

FIG. 1 is a perspective view of a plurality of clamp assemblies 100 mounting a plurality of solar panels 102 to a rotating rail 104. Specifically, clamp assemblies 100 fix panels 102 with respect to rail 104. When rail 104 rotates about an axis 106 passing coaxially through the center of rail 104, panels 102 will also rotate about axis 106. As the position of the Sun changes throughout the day, rail 104 is rotated slowly to maintain a perpendicular relationship between the planar top surfaces 108 of respective panels 102 and the direction of the incident sun light 110. As shown, the center one of clamp assemblies 100 facilitates the fixing of both panels 102 to rail 104.

In the example of FIG. 1, rail 104 has an octagonal cross-section. However, rail 104 can have any cross sectional shape including, but not limited to, round, square, triangular, rectangular, hexagonal, and so on. In such alternate embodiments, the inner profile of clamp assembly 100 can have a complementary profile, or at least a profile capable of securely engaging rail 104.

Figure 2:
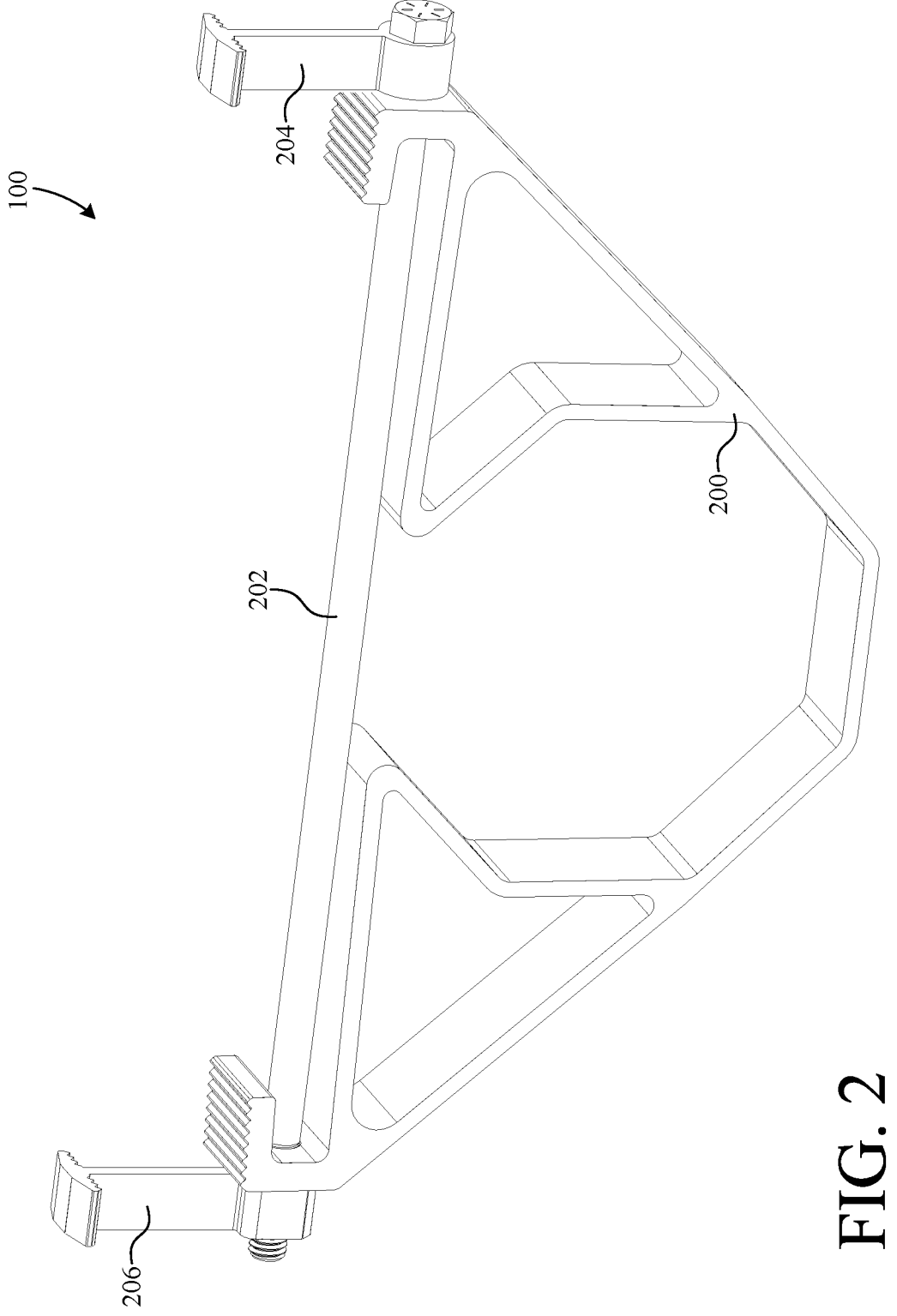
FIG. 2 is a perspective view of one of the clamp assemblies of FIG. 1.

FIG. 2 is a perspective view of clamp assembly 100, which includes a frame 200, a bolt 202, a first T-clip 204, and a second T-clip 206. T-clips 204 and 206 are bolted to frame 200 with bolt 202. In this example embodiment, clamp assembly 100 includes exactly four components.

Figure 3:
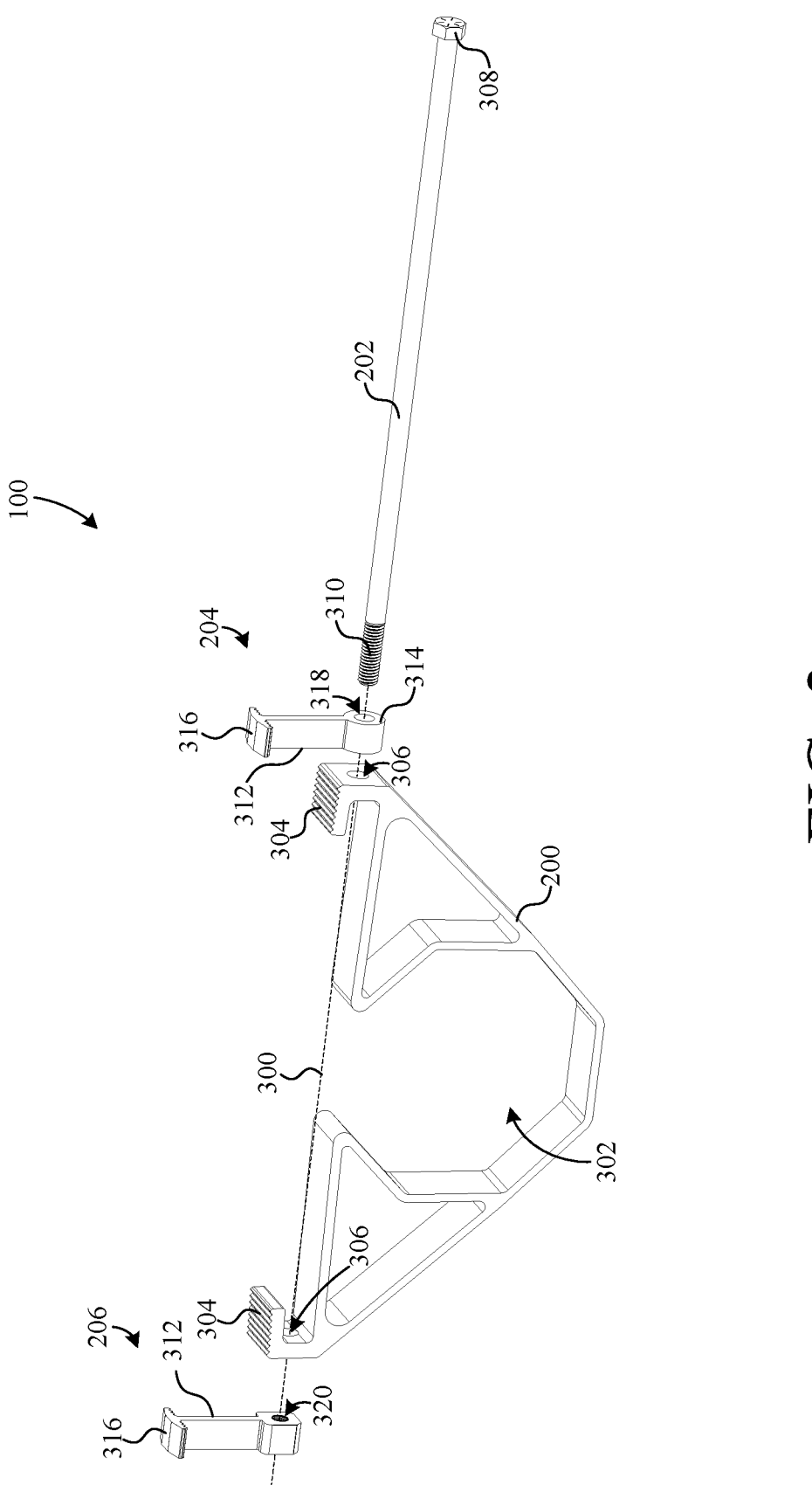
FIG. 3 is a perspective view of the clamp assembly of FIG. 2 exploded along an axis.

FIG. 3 is a perspective view of clamp assembly 100 exploded along an axis 300. Frame 200 is a monolithic aluminum structure formed by extrusion. Frame 200 defines an octagonal central region 302 that is configured to engage the complementary octagonal exterior surface of rail 104. In particular, the octagonal boundary of central region 302 includes seven solid sides and one open side. Frame 200 additionally includes a set of serrated pads 304, each being positioned and configured to simultaneously engage the bottom surfaces of two adjacent panels 102. That is, one side of each pad 304 abuts a side edge of one of panels 102, and the other side of each pad 102 abuts a side edge of an adjacent panel 102. Thus situated, side edges of two adjacent panels 102 can rest on each one of serrated pads 304. Furthermore, the serrations of pads 304 are configured to prevent sliding between panels 102 and frame 200, while also establishing a good electrical connection between frame 200 and electrodes formed on the bottom surfaces of panels 102. Each side of frame 200 defines a through hole 306, through which bolt 202 is disposed when clamp assembly 100 is assembled.

In this example embodiment, bolt 202 is a standard ⅜″ bolt having a hexagonal head 308 on a first end and a set of threads 310 on an opposite second end. However, it should be understood that standard bolts of different sizes, custom bolts, or any other suitable fasteners can be substituted for bolt 202.

T-clip 204 is a monolithic aluminum structure formed by extruding an aluminum beam and cutting the beam into multiple T-clips 204. The cutting of the beam forms two planar side surfaces on each T-clip 204; one of which engages the underside of head 308 of bolt 202 and the other engages the planar side surface of frame 200 adjacent through-hole 306. T-clip 204 includes an intermediate region 312 that extends between a base portion 314 and a top portion 316. Intermediate region 312 is configured to be disposed between the side edges of two respective adjacent panels 102. Base portion 314 defines a smooth through-hole 318 that is configured to slidably engage the smooth exterior surface of bolt 202, such that base portion 314 functions as a washer between head 308 of bolt 202 and the planar exterior sidewall of frame 200. The exterior profile of base portion 314 is substantially round, similar to a standard washer, for example a standard ⅜″ washer. Top portion 316 defines two serrated under surfaces, each being configured to engage the top surface of a respective one of adjacent panels 102. T-clip 206 is a monolithic structure that was extruded through a die that is different from the die through which T-clip 204 was extruded. In particular, T-clip 206 has flat sides that facilitate engagement with a standard open end wrench. Following extrusion, T-clip 206 is cut, and the central bore is threaded to mate with the threads 310 of bolt 202, so that T-clip 206 can function as a nut. Alternative fasteners that include an engagement mechanism (e.g., a cam lock) configured to engage a complementary engagement mechanism of T-clip 206 can be substituted for bolt 202.

Figure 4:
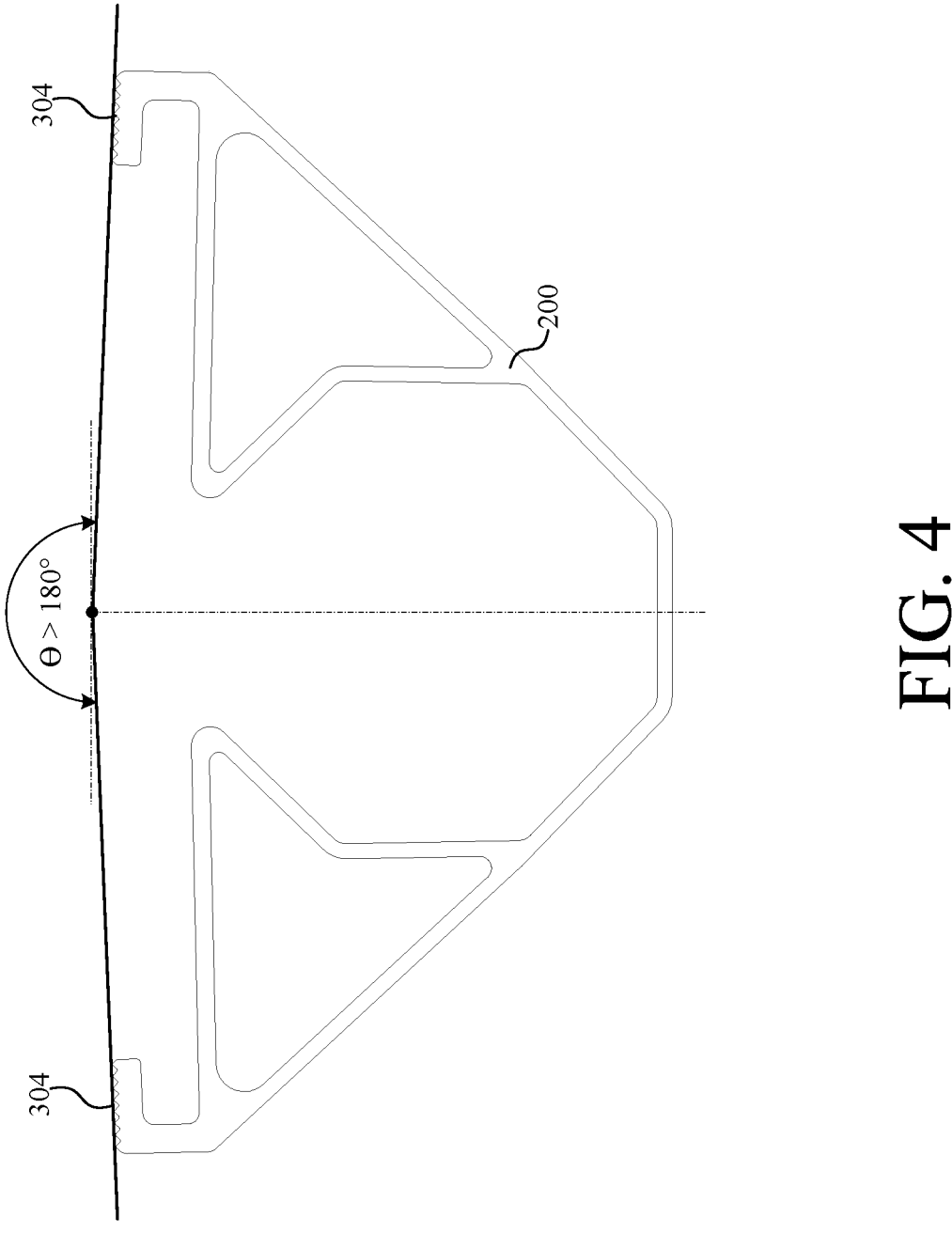
FIG. 4 is a side view of the frame of the clamp assembly of FIG. 3.

FIG. 4 is a front plan view of frame 200 in a relaxed state. Although it might appear that that the top of both pads 304 are coplanar, they are, in fact, not. Instead, they are angled slightly away from one another. In the relaxed state, as shown in FIG. 4, the angle Θ formed by intersecting planes defined by the top surfaces of pads 304 is slightly greater than 180°. As bolt 202 is tightened into threaded through-hole 320 of T-clip 206 during assembly, the opposite sides of frame 200 are drawn toward one another, flexing frame 200 and causing angle Θ to decrease.

Referring now to FIGS. 1-4, the flexing of frame 200, and the resultant change in angle Θ, causes the walls of smooth through hole 306 to frictionally engage the outer surface of bolt 202, which significantly reduces the chance of relative motion between bolt 202 and frame 200. In addition, intermediate portion 312 of clip 206 being positioned between adjacent panels 108 prevents rotation of clip 206. In other words, intermediate portions 312 of clips 204 and 206 prevent the rotation of the "washer-like" portion of clip 204 and the female threaded portion of clip 206 (thereby creating a "locking nut") with respect to clamp frame 200 and frictionally engaged bolt 202. The additional frictional contact between bolt head 308 and clip 204, the frictional contact between clip 204 and the surface of frame 200 adjacent through-hole 306, and the frictional contact between clip 206 and the surface of frame 200 adjacent the other through-hole 306 all further reduce the chance of any loosening of bolt 202 with respect to threaded through-hole 320. This secure, stable engagement of components prevents the loosening and failures of prior clamps.

Figure 5:
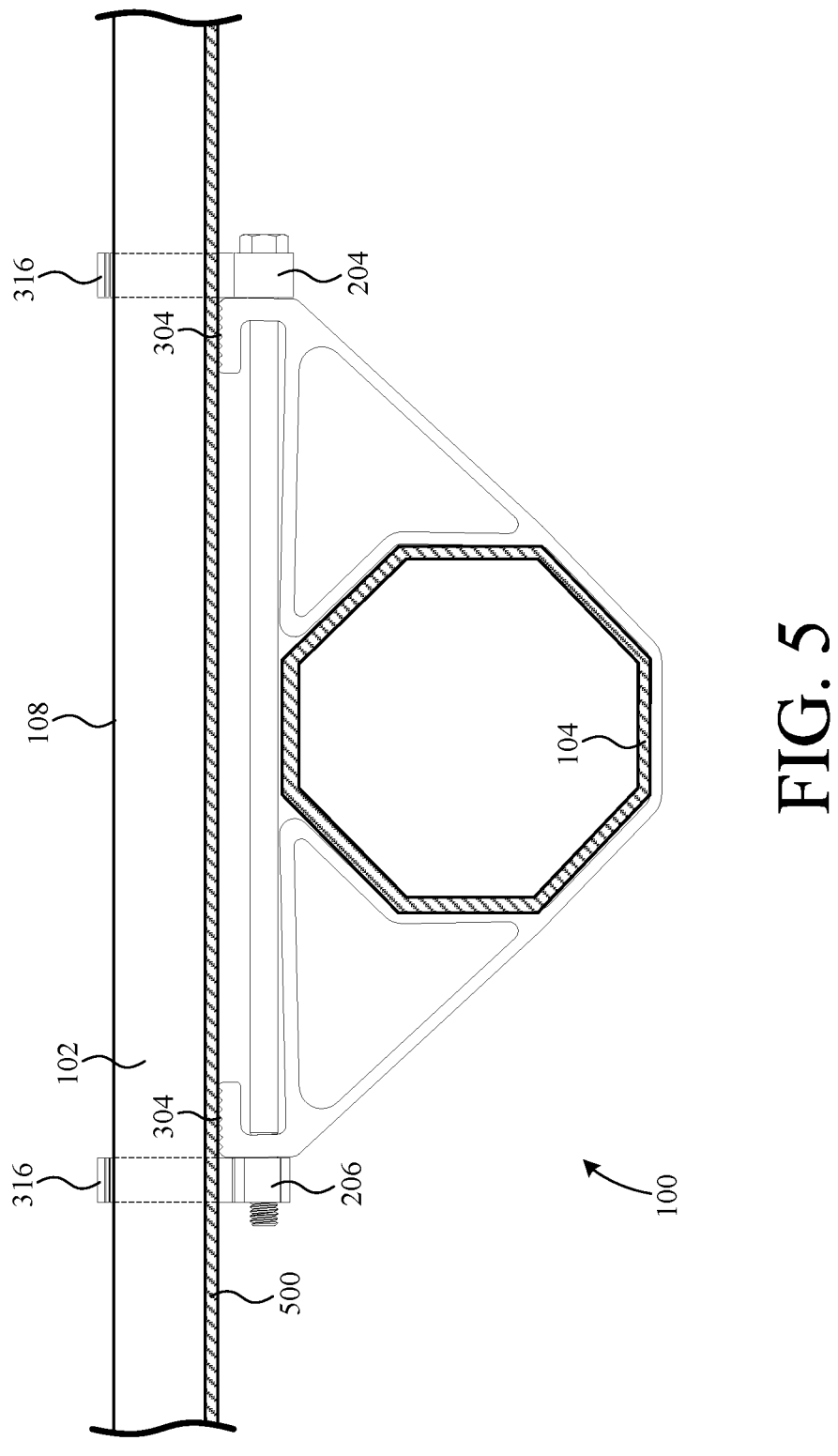
FIG. 5 is a side view of a solar panel clamped to a rotating rail with one of the clamp assemblies of FIG. 1.

FIG. 5 shows a front plan view of solar panel 102 fixed to rotating rail 104 via clamp assembly 100. As shown, the bottom surface of panel 102 includes an electrode 500 that facilitates an electrical connection between panel 102 and assembly 100. Each of pads 304 engages electrode 500. As previously described, pads 304 engage panels 102 with sufficient force to prevent relative motion between assembly 100 and panel 102. This force increases as bolt 202 flexes frame 200, thereby slightly changing the orientation of clips 204 and 206 with respect to panel 102. The opposite top surface 108 of panel 102 is directly engaged by top portions 316 of T-clips 204 and 206.

The serrations on pads 304 are oriented perpendicularly with respect to the serrations on the underside of top portions 316 of T-clips 204 and 206. The serrations function as grounding ridges/contacts between the highly conductive aluminum T-clips 204 and 206 and panels 102. Because the ridges are oriented perpendicularly with respect to one another, they prevent slippage of the panel in two different directions.

As assembled, conductive T-clips 204 and 206 complete an electrical path from panels 102 to ground. In particular, the path extends from panels 102, through T-clips 204 and 206 (in parallel), through frame 200, through rail 104, and through a supporting post (not shown) to ground. This electrical path protects panels 102 from accidental voltage surges, which might be caused, for example, by a lightning strike. The electrical path to ground is provided without requiring any additional components such as cables, clips, connectors, ground rods, and so on.

Figure 6:
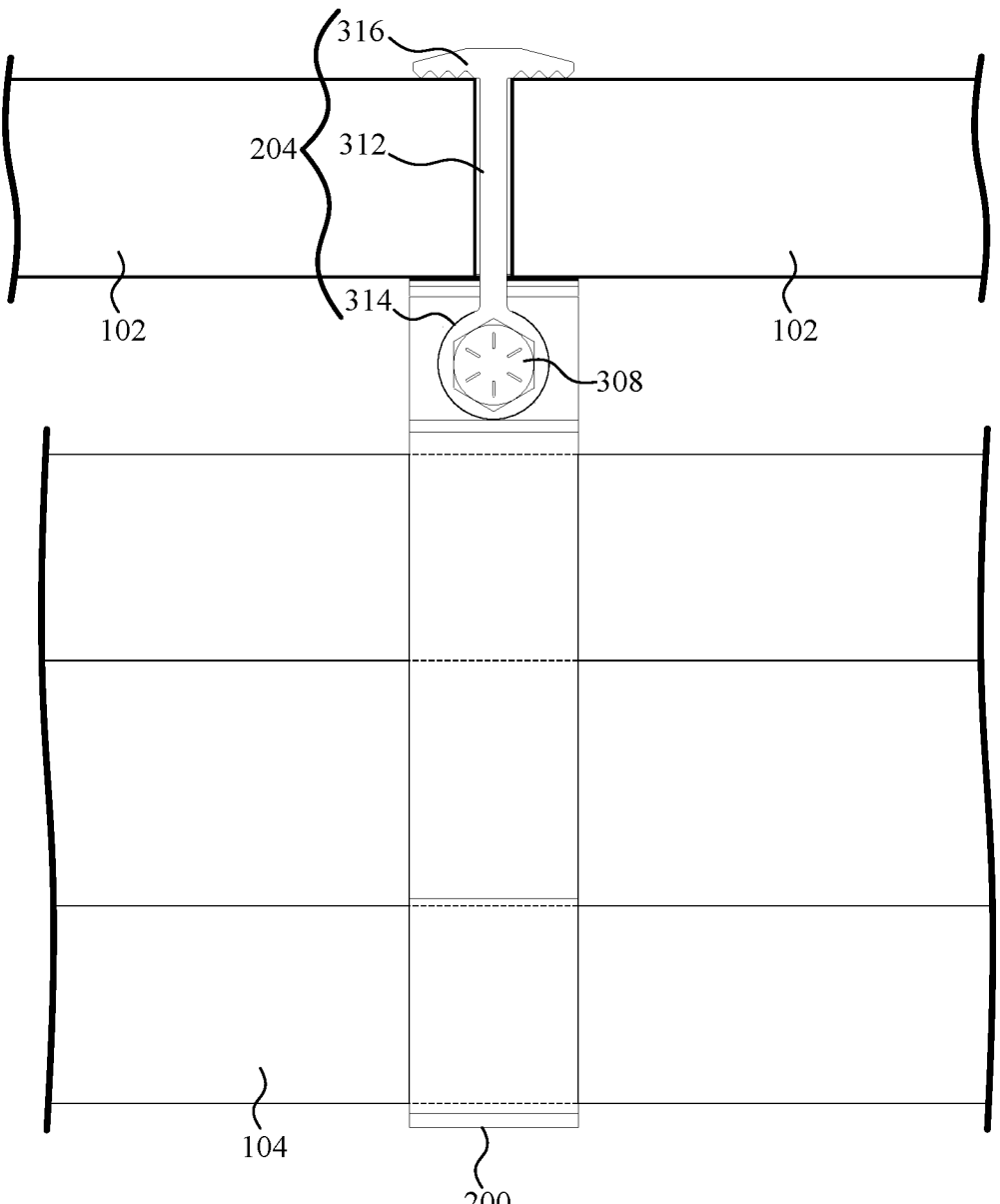
FIG. 6 is a side view of two solar panels clamped to a rotating rail with one of the clamp assemblies of FIG. 1.

FIG. 6 shows a side plan view of solar panels 102 mounted to rotating rail 104 via clamp assembly 100. Intermediate portion 312 of T-clip 204 extends between the peripheral edges of two adjacent panels 102, and top portion 316 of T-clip 204 simultaneously engages the top surfaces of both adjacent panels 102.

Figure 7:
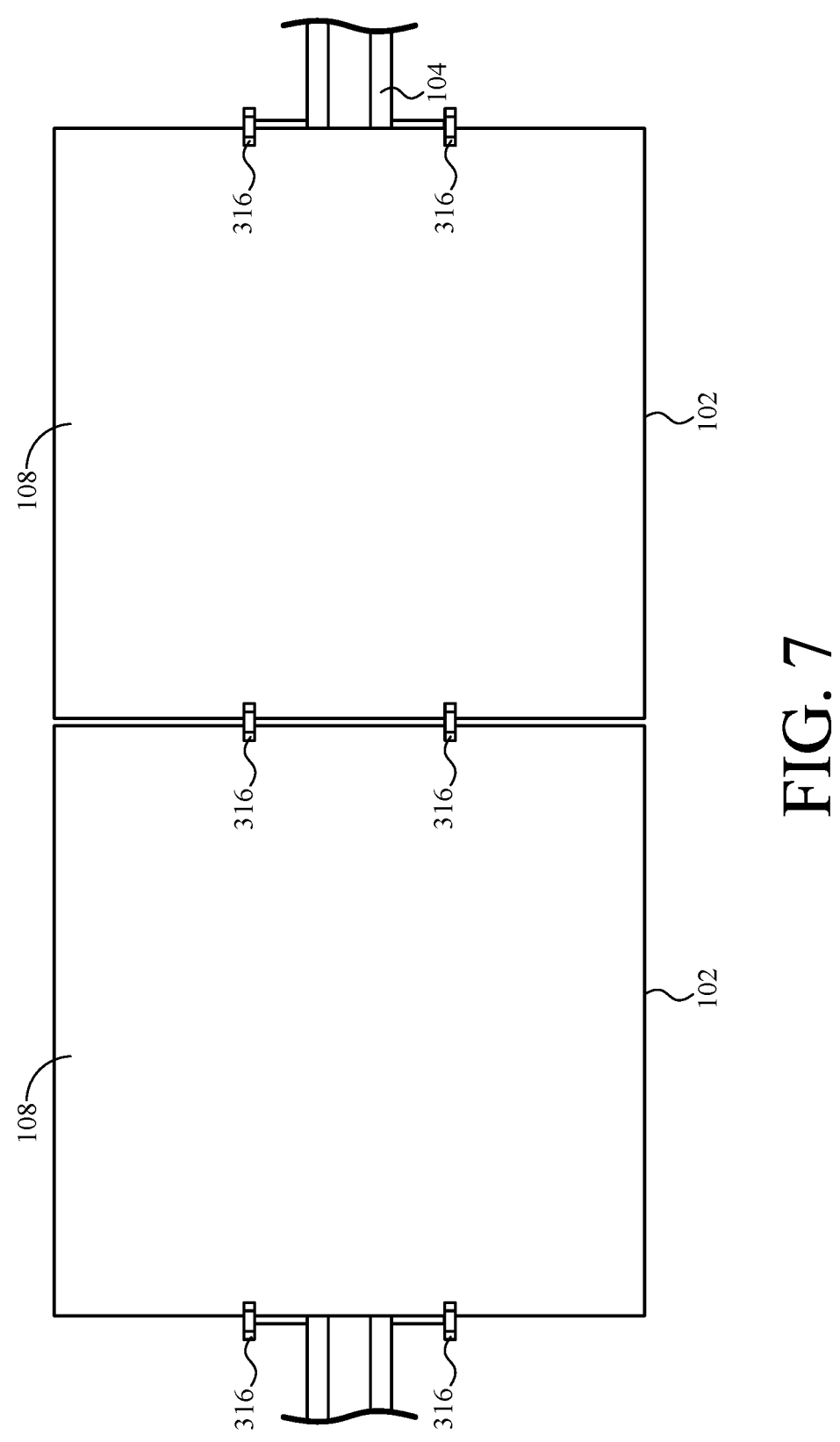
FIG. 7 is a top plan view of two solar panels clamped to a rotating rail with clamp assemblies of FIG. 1.

FIG. 7 shows a top plan view of multiple solar panels 102 mounted to rotating rail 104 via clamp assemblies 100. As shown, each panel 102 is mounted to rail 104 via two clamp assemblies 100, and each clamp assembly 100 is capable of clamping two adjacent solar panels 102 to rail 104. The clamp assemblies located at the ends of a row of panels only engage a single panel. In general, the number of clamp assemblies 100 required to mount a given number of panels 102 to a single rail 104 is equal to the number of panels plus one. For example, it requires 26 clamp assemblies 100 to mount 25 panels to a single rail 104.

Figure 8:
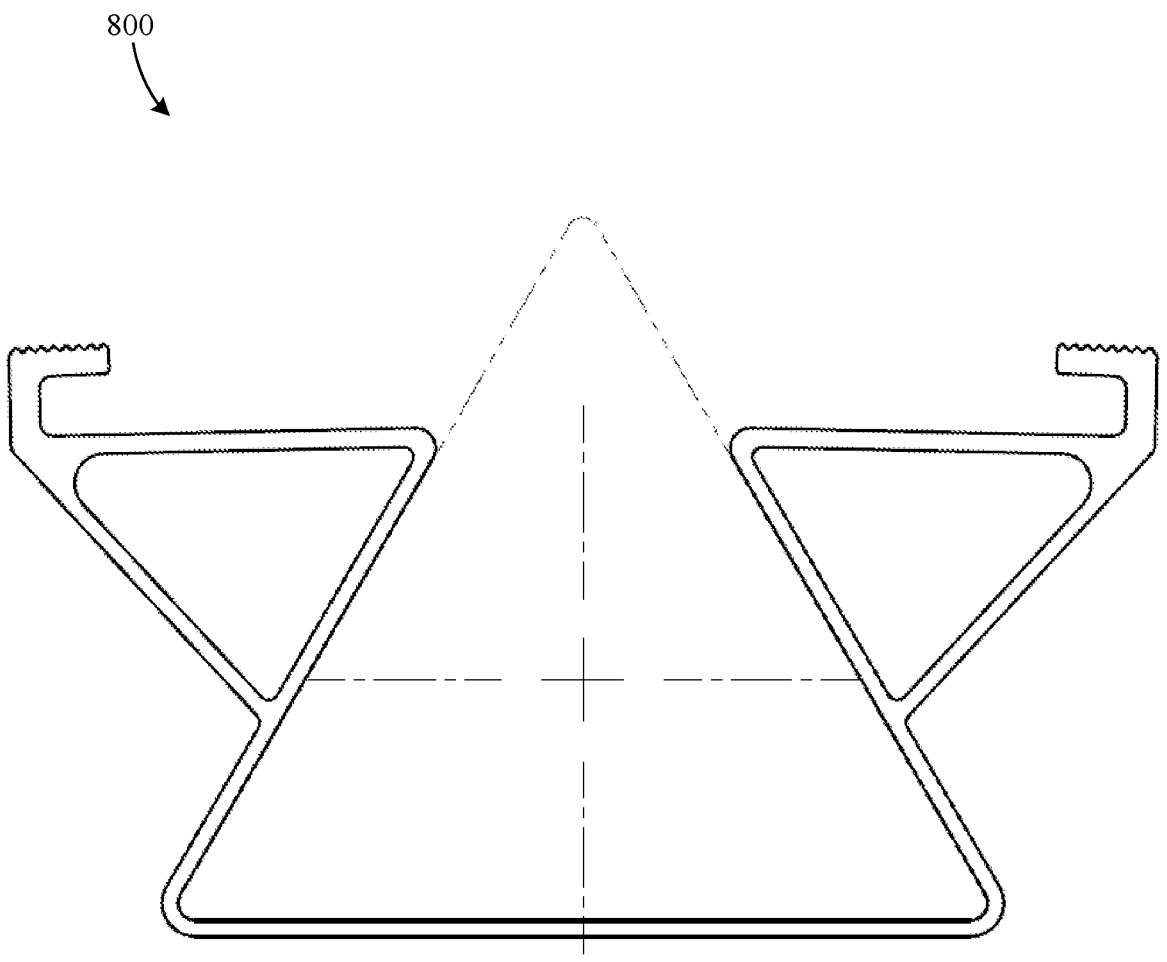
FIG. 8 is a side view of the frame of an alternate clamp assembly.

FIG. 8 is a side view of the frame of an alternate clamp assembly 800. The inner profile of the body of clamp assembly 800 is complementary to a triangular rail.

Figure 9:
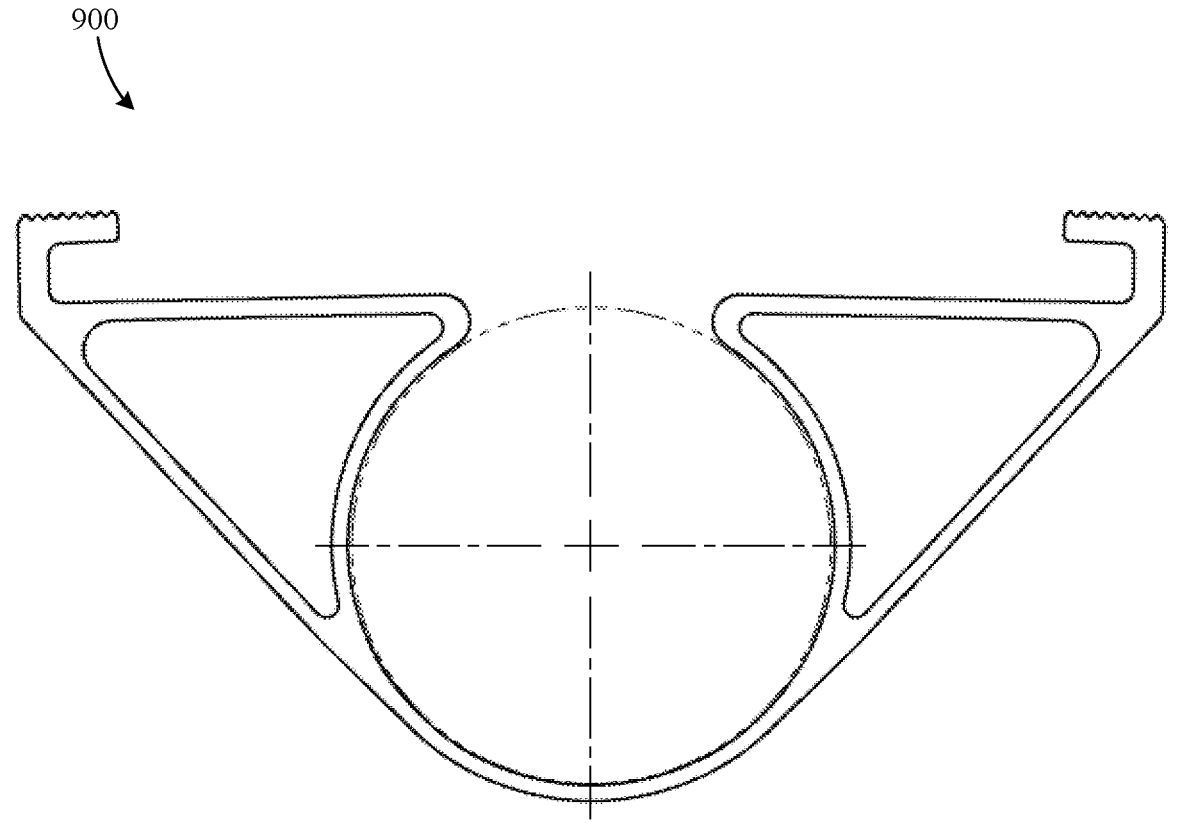
FIG. 9 is a side view of the frame of another alternate clamp assembly.

FIG. 9 is a side view of the frame of another alternate clamp assembly 900. The inner profile of the body of clamp assembly 900 is complementary to a round rail.

Figure 10:
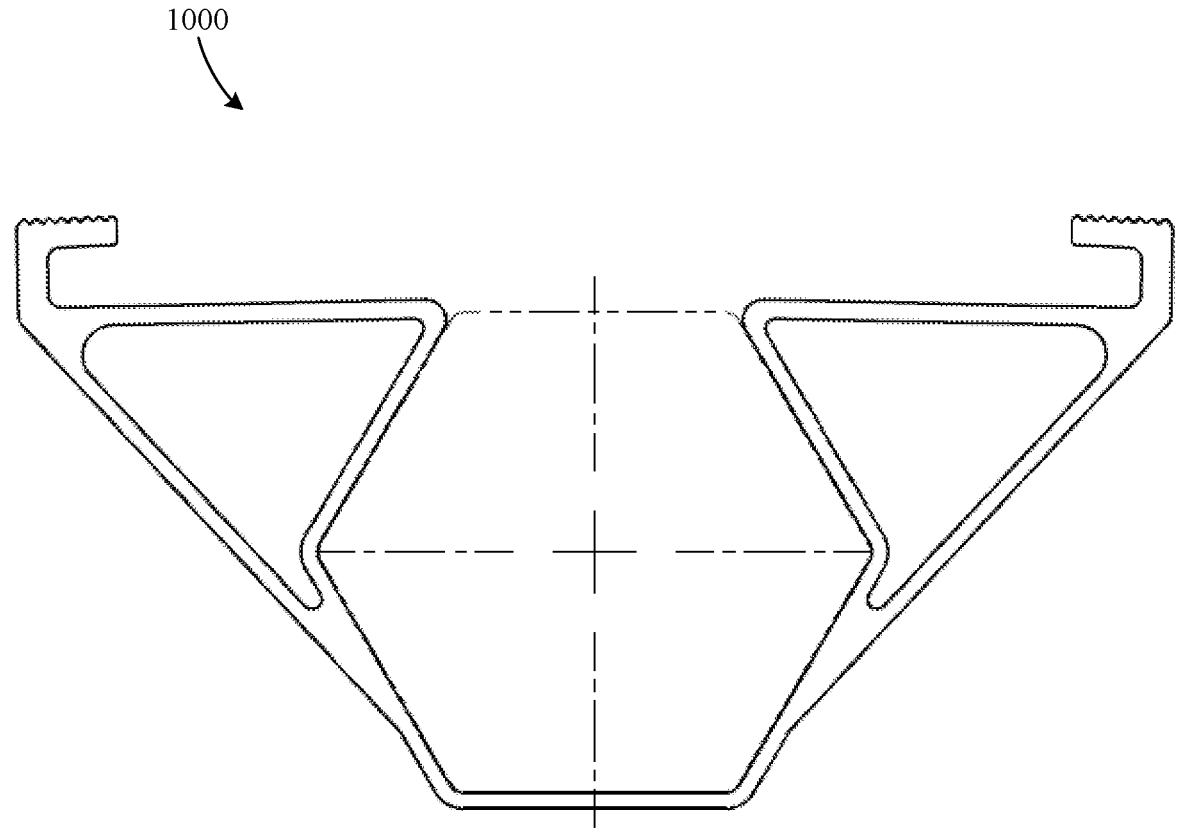
FIG. 10 is a side view of the frame of another alternate clamp assembly.

FIG. 10 is a side view of the frame of another alternate clamp assembly 1000. The inner profile of the body of clamp assembly 1000 is complementary to a hexagonal rail.

Figure 11:
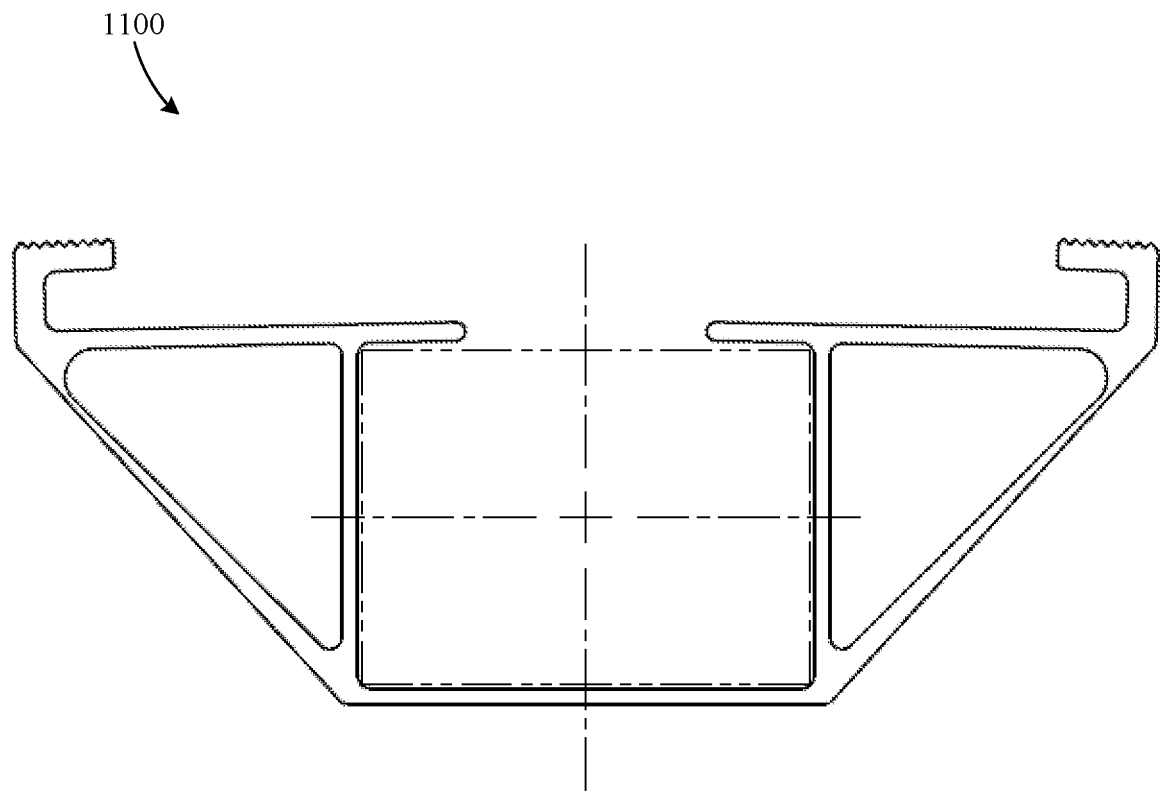
FIG. 11 is a side view of the frame of another alternate clamp assembly.

FIG. 11 is a side view of the frame of another alternate clamp assembly 1100. The inner profile of the body of alternate clamp assembly 1100 is complementary to a rectangular rail.

Figure 12:
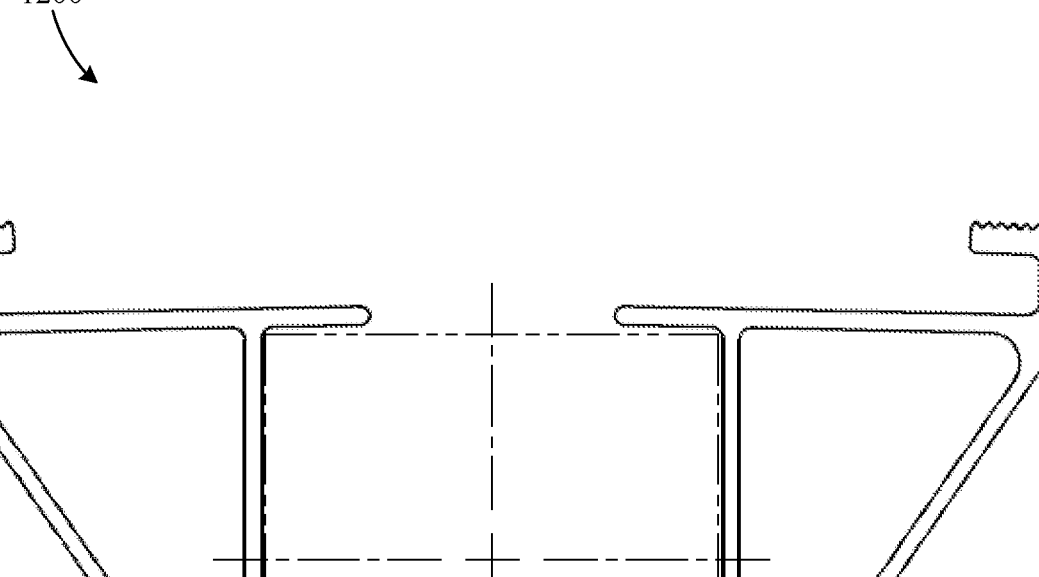
FIG. 12 is a side view of the frame of another alternate clamp assembly.

FIG. 12 is a side view of the frame of another alternate clamp assembly 1200. The inner profile of the body of clamp assembly 1200 is complementary to a square rail.

The description of particular embodiments of the present invention is now complete. Many of the described features may be substituted, altered or omitted without departing from the scope of the invention. For example, alternate profiles (e.g., round, elliptical, hexagonal, rectangular, etc.), may be substituted for the octagonal profile of frame 200 of clamp assembly 100. As another example, frame 200 and T-clips 204 and 206 may be formed out of alternate conductive metals and/or by alternate manufacturing processes (e.g., casting, machining, bending, stamping, etc.). These and other deviations from the particular embodiments shown will be apparent to those skilled in the art, particularly in view of the foregoing disclosure.

I claim:

1. A solar panel assembly comprising:
a rail including an outer surface, said outer surface having a particular contour;
a clamp frame including an inner surface, said inner surface having a contour complementary to said contour of said outer surface of said rail, said clamp frame defining a first aperture, a first contact pad, a second aperture, and a second contact pad;
a first solar panel having a rear surface abutting a first side of said first contact pad and a first side of said second contact pad;
a second solar panel having a rear surface abutting a second side of said first contact pad and a second side of said second contact pad;
a first clip including a fastener receiving portion, a panel engaging portion, and an intermediate portion extending between said fastener receiving portion and said panel engaging portion, said fastener receiving portion defining a third aperture, said first clip being disposed adjacent said frame with said third aperture aligned with said first aperture, said intermediate portion extending between said first solar panel and said second solar panel, said panel engaging portion including a first contact surface abutting a front surface of said first solar panel and a second contact surface abutting a front surface of said second solar panel;
a second clip including a fastener engaging portion, a panel engaging portion, and an intermediate portion extending between said fastener engaging portion and said panel engaging portion, said fastener engaging portion defining a fourth aperture, said second clip being disposed adjacent said frame with said fourth aperture aligned with said second aperture, said intermediate portion of said second clip extending between said first solar panel and said second solar panel, said panel engaging portion of said second clip including a first contact surface abutting a front surface of said first solar panel and a second contact surface abutting a front surface of said second solar panel; and a fastener passing through said first aperture, said second aperture, and said third aperture, and engaging said fastener engaging portion of said second clip; and wherein
said fastener includes a thread set;
said fastener engaging portion includes a complementary thread set;
said fastener includes a head opposite said thread set;
said head directly abuts a first side of said first clip;
a second side of said first clip directly abuts a first side of said clamp frame;
a second side of said clamp frame directly abuts a first side of said second clip;
said first side of said clamp frame is substantially parallel to said second side of said clamp frame; and
said first side of said clamp frame is substantially perpendicular to an axis passing through said first aperture and said second aperture.

2. The solar panel assembly of claim 1, wherein:
said first clip is a unitary structure;
said second clip is a unitary structure; and
said clamp frame is a unitary structure.

3. The solar panel assembly of claim 1, wherein at least one of said first contact pad and said first contact surface of said panel engaging portion of said first clip defines a set of serrations.

4. The solar panel assembly of claim 3, wherein:
said first contact pad defines a set of serrations oriented along a first direction; and
said first contact surface of said panel engaging portion of said first clip defines a set of serrations oriented along a second direction, said first direction oriented at a non-zero angle with respect to said second direction.

5. The solar panel assembly of claim 4, wherein said first direction is perpendicular to said second direction.

6. The solar panel assembly of claim 1, wherein said particular contour of said outer surface of said rail is polygonal.

7. The solar panel assembly of claim 1, wherein:
said first contact pad defines a first plane;
said second contact pad defines a second plane;
said first plane and said second plane form an angle that is greater than 180 degrees when said clamp frame is in a relaxed state; and
said first plane and said second plane form an angle that is less than or equal to 180 degrees when said clamp frame is flexed responsive to force exerted by said fastener.

8. The solar panel assembly of claim 1, wherein:
said first aperture defines a first central axis;
said second aperture defines a second central axis; and
a relative orientation between said first central axis and said second central axis changes when said clamp frame is flexed responsive to force exerted by said fastener.

9. The solar panel assembly of claim 8, wherein said change in said relative orientation between said first central axis and said second central axis increases a frictional force between a shaft of said fastener and a wall of said clamp frame defining said first aperture.

10. The solar panel assembly of claim 8, wherein:
said first aperture is a substantially circular bore; and
said second aperture is a substantially circular bore.

11. The solar panel assembly of claim 1, wherein said fastener engaging portion of said second clip has an outer contour configured to engage an open end wrench.

12. The solar panel assembly of claim 1, wherein said outer contour of said fastener engaging portion includes:

a first flat side; and a second flat side opposite said first flat side; and said first flat side is substantially parallel to said second flat side.

13. The solar panel assembly of claim 1, wherein said third aperture is a substantially circular bore.

14. The solar panel assembly of claim 13, wherein:

said first aperture is a substantially circular bore; and said second aperture is a substantially circular bore.

15. The solar panel assembly of claim 1, wherein:

said clamp frame is electrically conductive;

said first clip is electrically conductive; and said first clip and said clamp frame form a first portion of an electrical path from said first solar panel to ground.

16. The solar panel assembly of claim 15, wherein:

said second clip is electrically conductive; and said second clip forms a second portion of said electrical path in parallel with said first clip.

* * * * *